United States Patent
Percher

(10) Patent No.: US 9,206,637 B2
(45) Date of Patent: Dec. 8, 2015

(54) AUTOMATIC WATER SENSOR WINDOW OPENING SYSTEM

(71) Applicant: KING ABDULLAH UNIVERSITY OF SCIENCE AND TECHNOLOGY, Thuwal (SA)

(72) Inventor: Michael Percher, Pointe-Claire (CA)

(73) Assignee: KING ABDULLAH UNIVERSITY OF SCIENCE & TECHNOLOGY, Thuwal (SA)

( * ) Notice: Subject to any disclaimer, the term of this patent is extended or adjusted under 35 U.S.C. 154(b) by 0 days.

(21) Appl. No.: 13/891,588

(22) Filed: May 10, 2013

(65) Prior Publication Data

US 2013/0325265 A1 Dec. 5, 2013

Related U.S. Application Data

(60) Provisional application No. 61/645,803, filed on May 11, 2012.

(51) Int. Cl.
*E05F 15/20* (2006.01)
*G06F 17/00* (2006.01)
*E05F 15/695* (2015.01)
*E05F 15/72* (2015.01)

(52) U.S. Cl.
CPC ........... *E05F 15/2015* (2013.01); *E05F 15/695* (2015.01); *E05F 15/72* (2015.01); *G06F 17/00* (2013.01); *E05Y 2400/44* (2013.01); *E05Y 2800/428* (2013.01); *E05Y 2900/55* (2013.01)

(58) Field of Classification Search
CPC ..... E05F 15/2015; E05F 15/695; E05F 15/72; E05Y 2800/428; E05Y 2900/55; E05Y 2400/44; G06F 17/00

USPC .......................................................... 701/49
See application file for complete search history.

(56) References Cited

U.S. PATENT DOCUMENTS

| | | | |
|---|---|---|---|
| 6,281,647 B1 * | 8/2001 | Sasaki | 318/264 |
| 6,333,685 B1 * | 12/2001 | Miyake | 340/425.5 |
| 6,377,169 B1 * | 4/2002 | Yanagisawa | 340/504 |
| 6,459,168 B1 * | 10/2002 | Miyake et al. | 307/10.1 |
| 6,486,630 B2 * | 11/2002 | Takagi | 318/445 |
| 6,489,739 B2 * | 12/2002 | Maldonado | 318/445 |
| 6,588,532 B1 | 7/2003 | Adams | |
| 7,861,460 B1 * | 1/2011 | Costello et al. | 49/141 |
| 8,073,577 B2 * | 12/2011 | Kitamura et al. | 701/1 |
| 2001/0008369 A1 * | 7/2001 | Sasaki | 318/445 |
| 2001/0024063 A1 * | 9/2001 | Sasaki | 307/10.1 |
| 2002/0024309 A1 * | 2/2002 | Takagi | 318/445 |
| 2002/0070697 A1 * | 6/2002 | Maldonado | 318/445 |
| 2004/0160202 A1 * | 8/2004 | Sugiura et al. | 318/101 |
| 2009/0187314 A1 * | 7/2009 | Kitamura et al. | 701/45 |

FOREIGN PATENT DOCUMENTS

| | | |
|---|---|---|
| JP | H10292731 | 4/1998 |
| JP | 2000034860 | 2/2000 |
| WO | 2011/122941 | 10/2011 |

OTHER PUBLICATIONS

International Search Report for PCT/IB2013/001531 Mailed Nov. 13, 2013.

\* cited by examiner

*Primary Examiner* — Tuan C. To
(74) *Attorney, Agent, or Firm* — Steptoe & Johnson LLP

(57) ABSTRACT

A system can automatically open at least one window of a vehicle when the vehicle is being submerged in water. The system can include a water collector and a water sensor, and when the water sensor detects water in the water collector, at least one window of the vehicle opens.

22 Claims, 11 Drawing Sheets

AUTOMATIC WATER SENSOR WINDOW OPENING SYSTEM

CLAIM OF PRIORITY

This application claims the benefit of prior U.S. Provisional Application No. 61/645,803, filed on May 11, 2012, which is incorporated by reference in its entirety.

FIELD OF THE INVENTION

The present invention relates to a submergence detector for use on a vehicle.

BACKGROUND OF THE INVENTION

Every year, drivers of passenger vehicles involuntarily impact/drive into a body of water such as a lake, river, canal, sinkhole, shore line, collapsing through thin ice, getting caught in flash flooding, etc., resulting in thousands of people worldwide and hundreds of people in North America alone, drowning in their vehicles. People drown in this way, because before they actually realize what is happening to them due to shock and/or trauma, the water level has reached the power windows making it virtually impossible for these people to open their respective vehicle doors or windows that would have provided them with a means to exit their vehicles.

When a vehicle impacts a body of water such as a lake, river, canal, sinkhole, shore line, collapsing through thin ice, getting caught in flash flooding, etc., there are three distinct phases that occur namely:
1. Floating phase: A vehicle will remain afloat only until the water reaches the bottom of the side power windows (about 30 seconds to 90 seconds depending on the weight of the vehicle) and during the floating phase, a vehicle's side windows can still be opened.
2. Sinking phase: Once the water level has reached a vehicle's side windows, the water pressure will press the window against the doorframe, making it impossible to open it. It does not matter how long this period is. Even though the vehicle is visible, it is a tomb with windows and doors that cannot be opened.
3. Submerged phase: Even though the vehicle is now completely under water, not all the air will have yet escaped. Trapped occupants would have to wait for the vehicle to fill completely with water before the pressure equalizes allowing doors to be opened. Unfortunately, trapped occupants will probably have drowned by then as evidenced by the thousands of such deaths each year.

Generally, a power window apparatus is made up of a driver seat window opening unit, a front passenger seat window opening unit, a rear right side window opening unit, a rear left side window opening unit, and in most cases, a driver master window opening unit.

In this case, the driver seat window operation unit has at least driver seat open and close switches, front passenger seat open and close switches, rear right seat open and close switches, rear left seat open and close switches, a driver seat window open/close motor, a motor driver composed of a relay for example for rotationally driving the motor so as to open or close the driver seat window according to the operation of the driver seat window open or close switch, and a controller (CPU) for controlling the entire driver seat window operation unit.

The front passenger window operation unit, the rear right seat operation unit, and the rear left seat operation unit each have at least window open and close switches, a window open/close motor, a motor driver for rotationally driving the motor so as to open or close the window according to the operation of the window open/close switch, and a controller (CPU) for controlling the entire window operation unit.

In the above-mentioned known power window apparatus, when the driver manually operates the driver seat window open or close switch located on the driver seat window operation unit, the driver seat window is opened or closed; when the driver manually operates the front passenger seat window open or close switch located on the driver seat window operation unit, the front passenger seat window is opened or closed; when the driver manually operates the rear right seat open or close switch in the driver seat window operation unit, the rear right seat window is opened or closed; when the driver manually operates the rear left seat open or close switch in the driver seat window operation unit, the rear left seat window is opened or closed and when the driver manually operates the master open or close switch in the driver seat window operation unit, all power windows (excluding sun roof windows) window are opened or closed.

When the front passenger manually operates the window open or close switch in the front passenger seat window operation unit, the front passenger seat window is opened or closed. When the rear right passenger manually operates the window open or close switch in the rear right seat window operation unit, the rear right seat window is opened or closed. When the rear left passenger manually operates the window open or close switch in the rear left seat window operation unit, the rear left seat window is opened or closed.

However, if a vehicle equipped with such a power window apparatus has been submerged in water for some reason and the water infiltrates the inside of the vehicle passenger compartment area, the water also infiltrates the door pockets, affecting the driver seat window operation unit, the front passenger seat window operation unit, and rear right and left seat window operation units. In these window operation units, the water infiltrates the window open and close switches more often than other components of the window operation units, because the manual operation section of these switches is exposed outside. If the water gets inside the window open switch or the window close switch, getting eventually between the switch contacts, the water provides a low resistor between the contacts, thereby preventing the normal open/close state of the contacts.

If, in such a state, the driver or a passenger operates the window open switch in the corresponding window operation unit, the window may not be opened, making it difficult for the driver and passenger(s) (if applicable) to exit the vehicle.

SUMMARY OF THE INVENTION

The present invention relates to a submergence detector for use on an vehicle for opening all of a vehicle's front side and rear side passenger power-driven windows without any driver or passenger intervention should said vehicle become submersed in water; thus, providing the driver and any passenger(s) to exit said vehicle through one or more opened windows before having to wait until the inside pressure of the vehicle becomes pressurized To overcome the previously described problem, a system and method was developed to permit a vehicle's power windows would have to be automatically opened or shattered should said vehicle impact a body of water in much the same way that airbags are automatically deployed when the vehicle is involved in a crash. In some embodiments, shattering the power windows can be less attractive for the following main reasons:

1. A power driven punch would have to be installed inside each power window door that is labor intensive and would also add unnecessary weight to a car at a time when automakers are looking for ways to reduce a car's weight.
2. Moving pieces of shard could potentially injure car occupants.
3. Power driven punches are mechanical devices and as such, are susceptible to problems especially given that they would be located inside car doors that are frequently opened and closed over the lifetime of the car.
4. As a precaution, the power driven device should be checked on a regular basis when a car owner brings the car in for routine maintenance. Such a check, if done properly and thoroughly, would have to test all four power driven punches resulting in shattering all four power windows.
5. There is a strong possibility that within the next five years, automakers will convert existing glass windows to laminated polycarbonate windows reducing the weight of existing glass windows by up to 50% resulting in improved fuel economy as well as added protection for car occupants. Polycarbonate windows are over 200 times stronger than current glass windows that place in doubt, the ability of a power driven punch to shatter polycarbonate windows.

A system can automatically lower a car's front and rear side power windows should said car impact a body of water such as a lake, river, canal, sinkhole, flash flood, collapsing though thin ice and so forth.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

Figure 1:
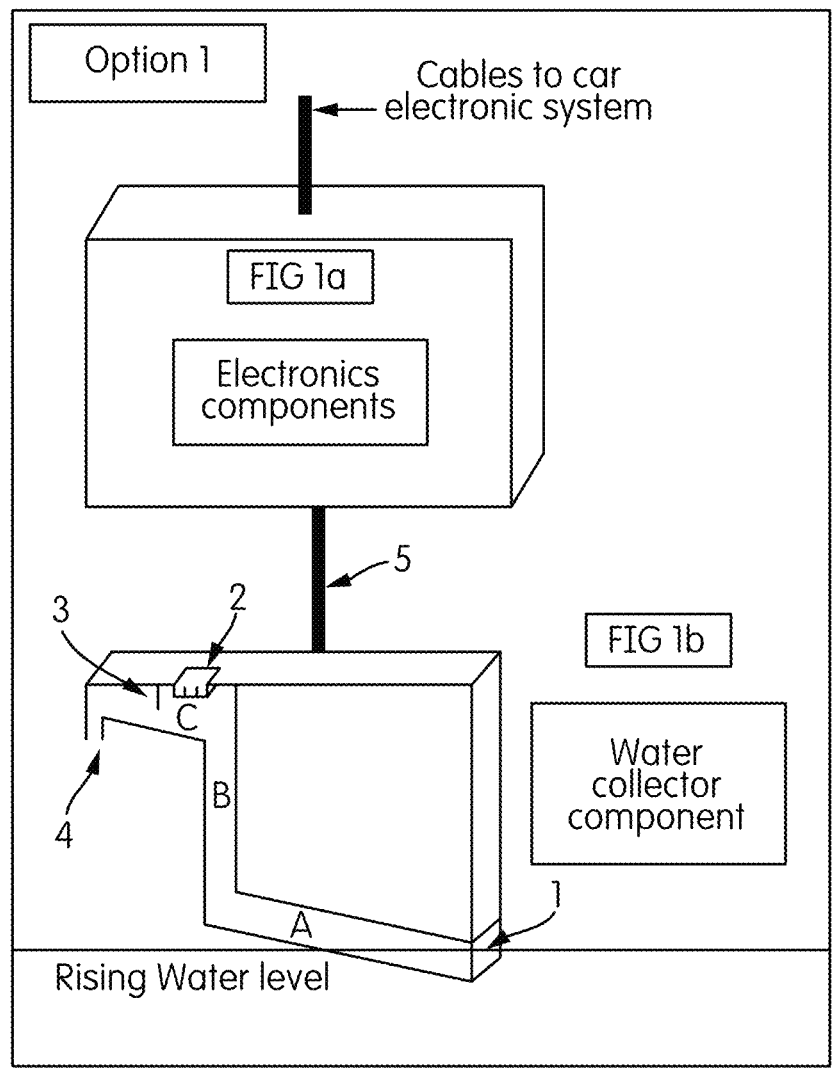
FIG. 1 is a block diagram of the components of a first embodiment of the present invention.

Referring to FIG. 1, there is illustrated a preferred embodiment of the invention (Option 1) that is comprised of two encasements namely an electronics component (FIG. 1*a*) and a water collector component (FIG. 1*b*) that are both located inside the engine compartment area.

Water Collector Component (FIG. 1*b*)

As a vehicle starts to sink in a body of water, the rising water will enter the water collector component at its opening (1) and will rise up sloped chamber A, vertical chamber B and eventually into sloped chamber C. As the water flows through sloped chamber C, it will pass through 2 open metallic probes (2) creating a closed circuit between the two probes that in turn, will be acted upon by the electronics component (FIG. 1*a*).

The top opening (4) at the end of sloped chamber C allows an escape route to prevent the buildup of air pockets within chamber C that otherwise, could prevent the rising water from reaching the two open metallic probes, thus preventing them from forming a closed circuit. Note that the metallic probes may be non-contact capacitive.

The water ingress unit is purposely designed with three sloping chambers to minimize water from reaching the two metallic probes should the vehicle drive through slush, water puddles, etc. on the road whereby said slush, puddles, etc. would simply slide backwards through chambers C, B and A due to gravity. In case splashing water enters the unit by opening 4, a water guard (3) will prevent the splashing water from reaching the 2 open metallic probes (2). The water collector and electronics components communicate via cable (5). The length of cable (5) can vary depending on where a given automaker wishes to install each of the two components within the engine compartment area.

Electronic Components (FIG. 1*a*)

Figure 2:
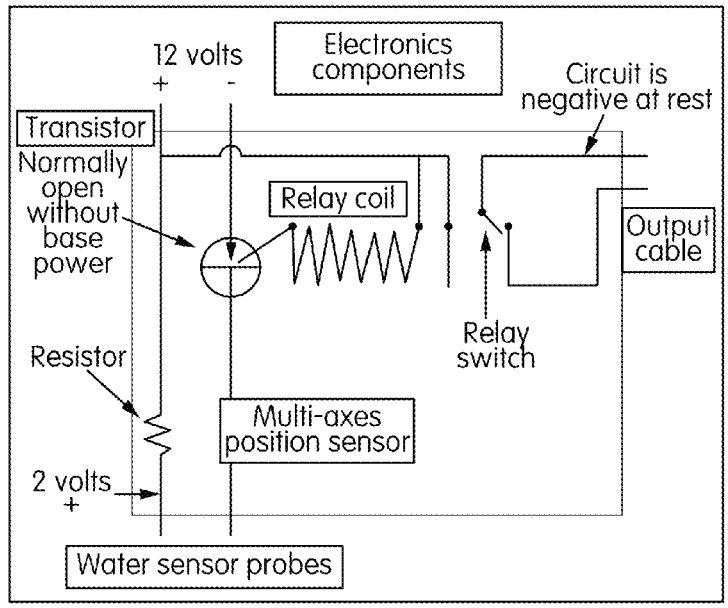
FIG. 2 is a block diagram of the electronics components shown in FIG. 1.

Referring to FIG. 2, positive and negative 12-volt cables from a 12-volt power source provides power to the electronics components.

The 12-volt power source can supply power to a multi axes position sensor (not shown in FIG. 2). The multi axes position sensor can be any suitable sensor with axes-detecting capabilities. The multi axes position sensor contains predefined position criteria for roll and pitch axes and a switch which has a default off position. When the roll and pitch axes meet predefined position criteria, the switch turns on.

The positive 12-volt cable is connected to the end of the relay coil, to the left side of the relay switch and can supply 12-volt positive power to the multi axes position sensor, if present. In addition, the positive 12-volt cable is connected to a resistor that reduces it down to between 1.5 and 2 volts positive which becomes one of the two water probes. In other embodiments, the resistor can be optional or has a value to bring the voltage down to any suitable range.

The negative 12-volt cable is attached to a transistor (denoted by a black arrow) and passes through the multi axes position sensor becoming the $2^{nd}$ of the two water probes. In addition, it can supply 12-volt negative power to the multi axes position sensor.

Until the two water probes form a closed circuit via conductivity of water, the relay switch remains a negative switch at rest.

When the two water probes do form a closed circuit via conductivity of water, the relay switch remains open. When the two water probes do form a closed circuit via the conductivity of water, the 2 volts are passed on to the transistor only when the roll and pitch axes meet predefined position criteria. In such a case, a portion of the relay switch is attracted clockwise to the node on its right creating a positive 12-volt signal to the output cable.

Figure 3:
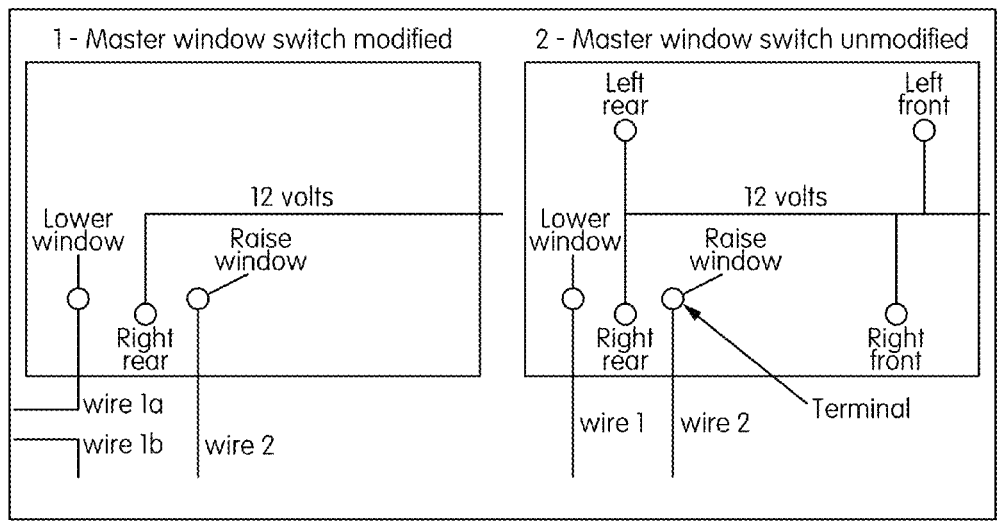
FIG. 3 is a block diagrams of a left front window interface switch modified according to an embodiment of the present invention.

In effect, there are four (4) such output cables with corresponding relay coils and switches leading to the Left Front, Left Rear, Right Front and Right Rear window switches. FIG. 3 is an example of a Left Front interface. Note: If the vehicle is equipped with a master switch that lowers and closes the Left Front, Left Rear, Right Front and Right Rear windows, then only one output cable leading to the driver's master switch would be required.

In the right portion of FIG. 3, both the Lower window and Raise window wires continue their normal path and will either stay at rest, lower the window or open the window as acted upon the driver.

In the left portion of FIG. 3, the Lower window wire is directed to the Rear Right circuit cable inside the Electronics component. If the Rear Right circuit cable inside the Electronics component is negative at rest, this will result in the same outcome as the right portion. If the Rear Right circuit cable inside the Electronics component has become positive, this will automatically lower the Rear Right window. The same logic is also true for the FR, RL and RR windows.

Option 2

Figure 4:
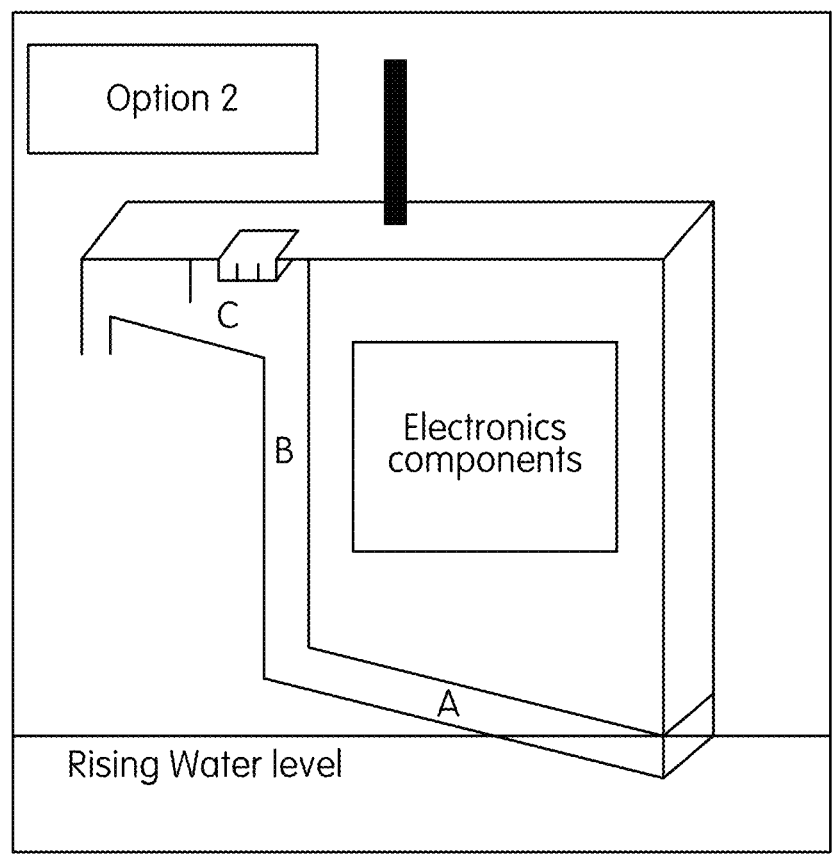
FIG. 4 is a a is a block diagram of the components of a second embodiment of the present invention.

Referring to FIG. 4, there is shown a second alternative embodiment of the present invention (Option 2), which is identical in terms of functionality and components to option 1, except both encasements are housed in one encasement. This version may be less expensive to mass-produce in some cases.

The automakers have the choice of using either a one-encasement unit or two encasement units. This unique feature is useful should a given automaker's cars not have sufficient space in the engine compartment area to house the one-encasement unit. The two-encasement unit is also useful in vehicles such as mini-vans where the back end could be heavier than the front end. In such a case, our system can be easily modified to have both a front-end and back-end water collector unit connected in parallel to the electronics component unit.

Figure 5:
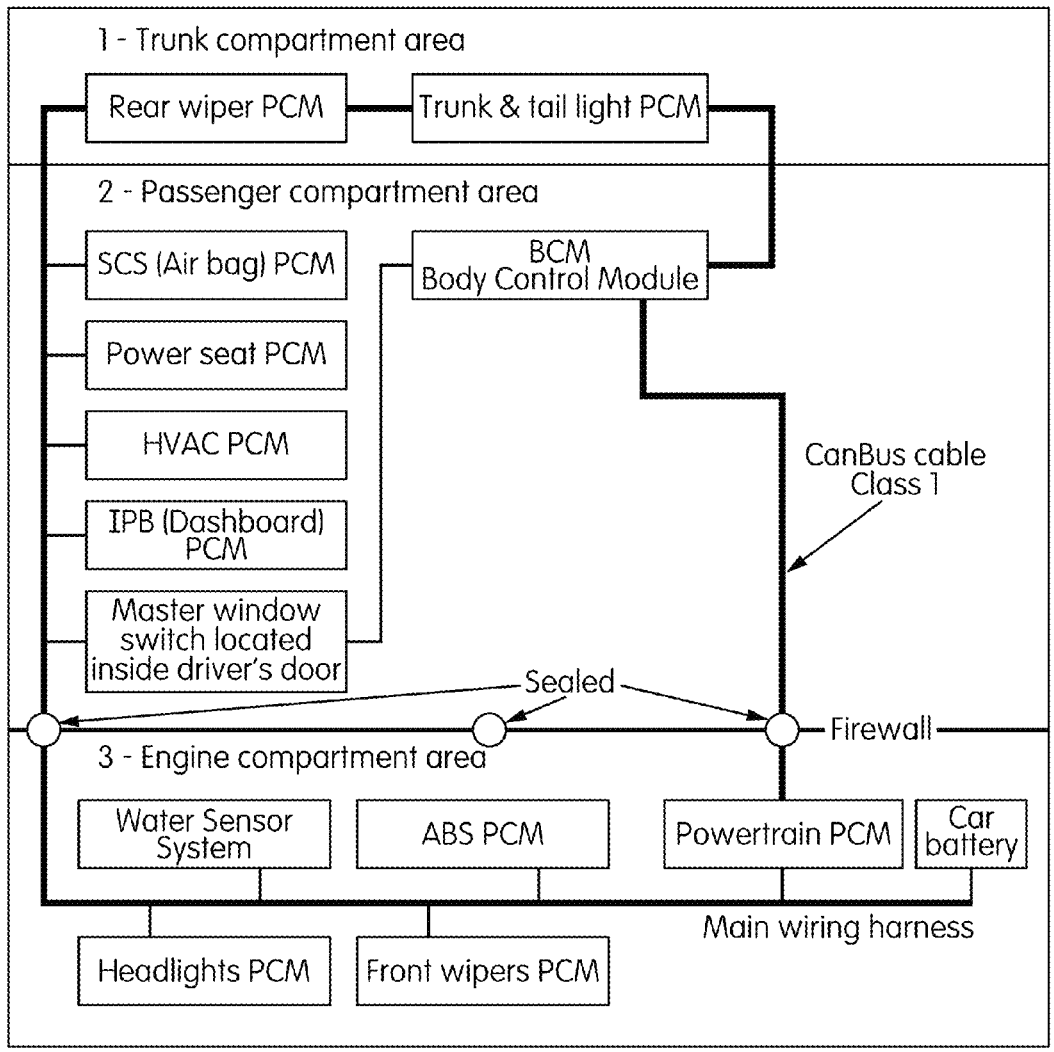
FIG. 5 is a block diagram of a vehicle's different compartments and control modules, according to an embodiment of the present invention.

Referring to FIG. 5, there is shown a simplified layout of a vehicle's (1) Trunk compartment area; (2) Passenger compartment area and (3) Engine compartment area. In each compartment, there are PCMS (Power control modules) that control one or more devices such as the Trunk & tail light PCM in the Trunk compartment area. The main wiring harness (solid orange line) carries power from the vehicle's battery and network (CanBus—class 2) cabling and travels through the entire vehicle providing power and device-to-device communications to the PCMS and any other device that requires power and communications. The solid blue line (CanBus cable—class 1) acts as a direct communications link between the BCM and the powertrain PCM in the engine compartment area.

Before a new model vehicle reaches the assembly line, its engineers have already designed that vehicle's main wiring harness and CanBus communication cables allowing an automobile manufacturer to significantly reduce assembly costs. Thus, the wiring circuitry required by our water sensor unit will have already been in place by the time that the car reaches the assembly line. You will note that in the diagram of FIG. 5, both versions of our water sensor system would be easy to install as each would simply interface with existing circuitry.

Engine Compartment Area

All electronic components including both versions of our new water sensor system are completely sealed and as such, are not adversely affected should rising water enter into the engine compartment area. In addition, a vehicle's battery in good condition will continue to supply uninterrupted power for at least 30 minutes even if it's completely submersed in water. To significantly slow down the ingress of water from the engine compartment area to the passenger compartment area, both areas are protected by a sealed firewall and even the cables that pass through the firewall are additionally sealed. This means that water will rise at a much slower rate inside the passenger compartment area than it would on the outside of the car.

Passenger Compartment Area

Figure 6:
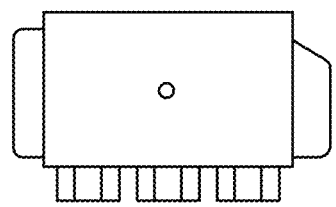
FIG. 6 is a top view of a known Power Control Module of a vehicle.
Figure 7:
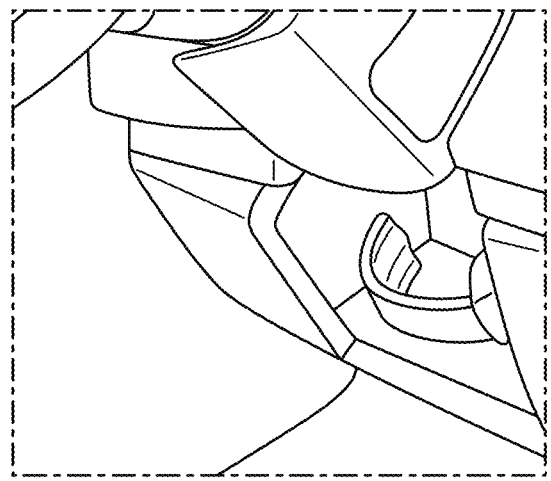
FIG. 7 is a perspective view of the location in the vehicle of the Power Control Module shown in FIG. 6.

Electronic components are not sealed given that automakers never envisioned a situation whereby the passenger compartment area could become inundated with water under normal driving conditions. While our field test in Manitoba did not cause any significant volume of water to infiltrate the passenger compartment area, we advocate sealing the BCM that is not expensive to do before a vehicle hits the assembly line. By sealing the BCM in conjunction with all components in the engine compartment that are already sealed, our system will work reliably even if water should enter the passenger compartment area. The PCMS and BCM are located inside the dashboard area as illustrated in FIGS. 6 and 7.

Figure 8:
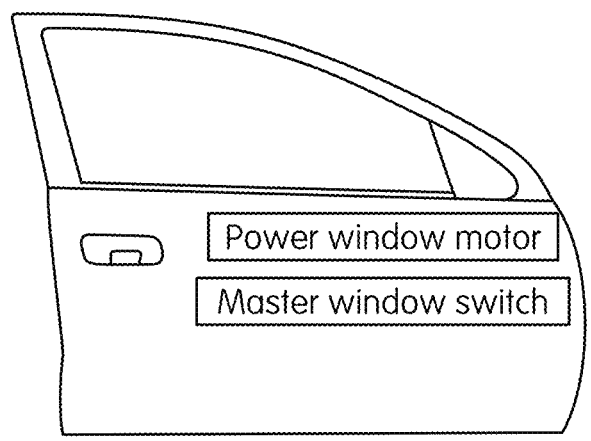
FIG. 8 is a side view of a known vehicle door illustrating the location of the power window motor and master window switch.

Referring to FIG. 8, it is noted that in virtually all vehicle models, the power window master switch (if present) and the RL, FL, RR and FR are located inside the driver's door roughly where the armrest is located on the inside of the door.

This actually plays to our advantage in so much as water from the outside will infiltrate and rise up a vehicle's door at a much slower rate than the rise of the water on the outside of the vehicle. Stated differently, the outside water level, on average, will reach the outside of the power windows within 30 to 90 seconds making it impossible to then open the power window. On the other hand, The main route of water ingress into the passenger compartment area is through the condensation vents located underneath the doors and as such, it would take at least 40 seconds for water to reach the power windows master switch located inside a door which by such time, our system will have already activated the power windows. In addition, our tests have demonstrated that a power window motor can still be operated while completely submerged.

Figure 9:
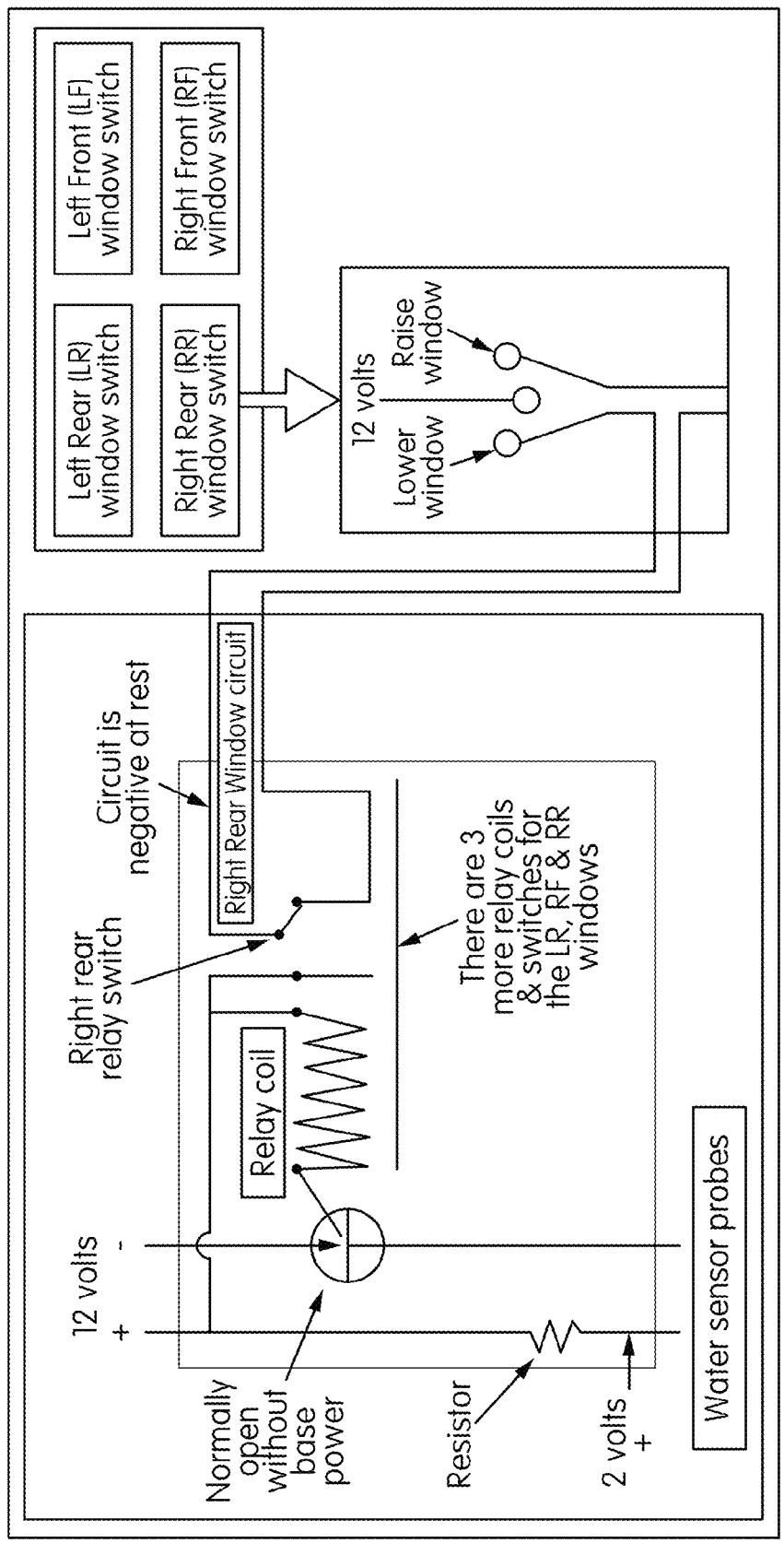
FIG. 9 is a block diagram showing an example of the electronics components in FIG. 1.

Referring to FIG. 9, there can be up to four relay coils and switches for the left rear, left front, right rear, and right front windows.

Figure 10:
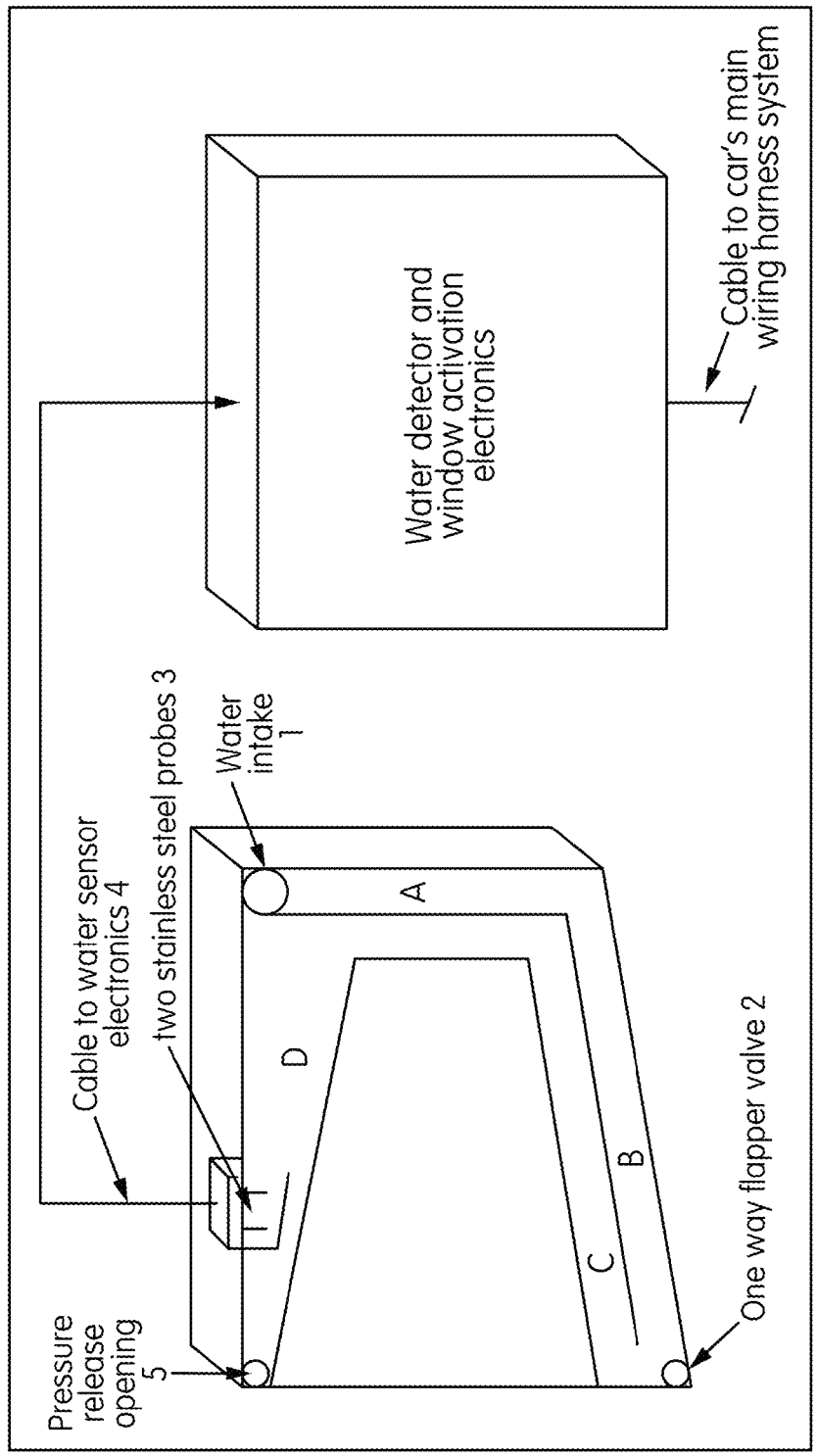
FIG. 10 is a block diagram showing a system that automatically opens at least one window of a vehicle when the vehicle is in water.

Referring to FIG. 10, a block diagram shows a system that automatically opens at least one window of a vehicle when the vehicle is in water. The system can include water detector and window activation electronics and a water collector. Regarding the water collector, water enters the collector through water intake (1). When the vehicle is not submerged in water, the water entering through intake (1) leaves the water collector through a one-way flapper valve (2). When the vehicle is submerged in water, water will pass through two open metallic probes (3) creating a closed circuit between the two probes that in turn, will be acted upon by the electronics component, such as the water detector and window activation electronics.

The water collector can include an inlet through which water enters the water collector. The water collector can include a one way outlet through which water leaves the water collector when the water collector is not submerged in water. The water collector can include a chamber including an opening for water to enter. The water collector can include an opening for air to escape from the chamber.

The water sensor (water detector) can include at least one relay switch that is adapted to open at least one window of the vehicle when the water sensor detects water in the water collector. The device can include one relay for each window that can by open. The water sensor can include a probe capable of forming a closed circuit with the presence of water.

The water sensor can be connected to the electric system of the vehicle through a wire. Alternatively, the water sensor can be connected to the electric system of the vehicle wirelessly. The water collector and the water sensor can be in a housing. The water collector and the water sensor can be in separate housings.

Figure 11:
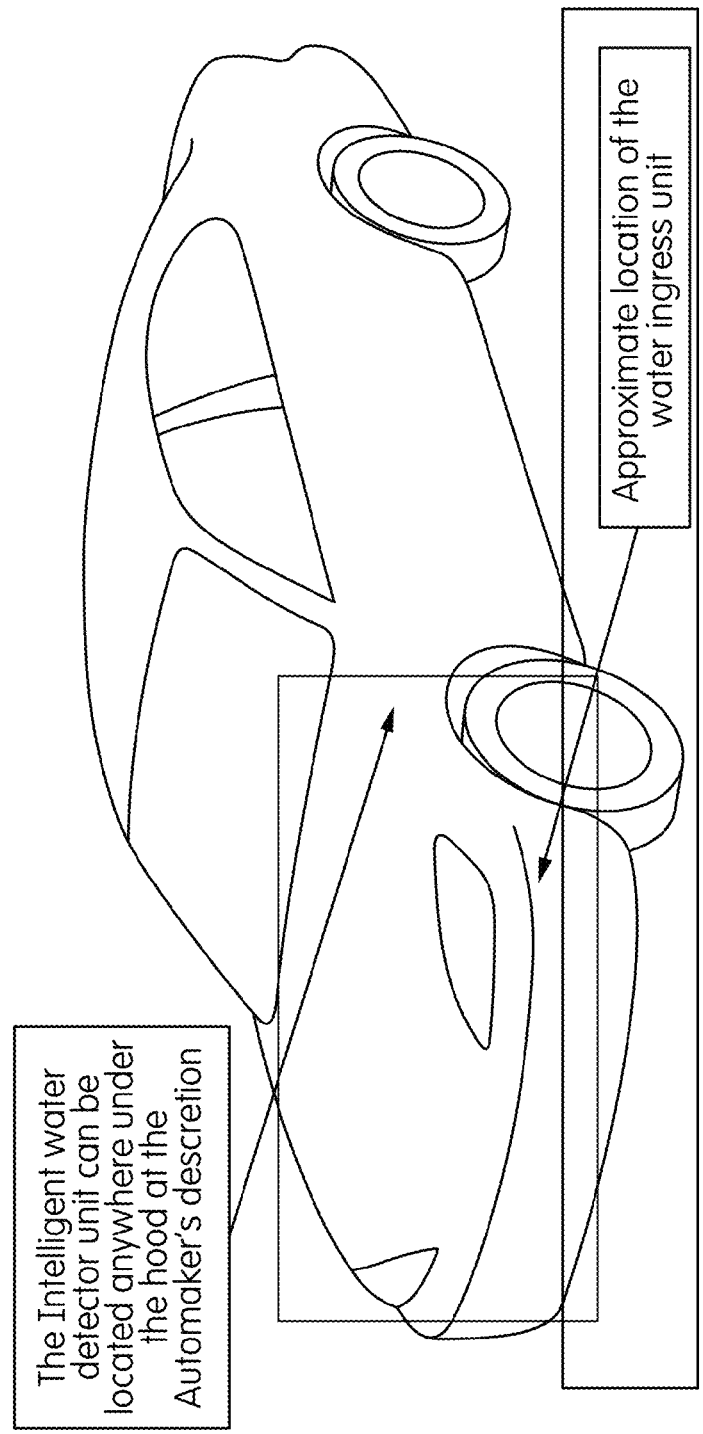
FIG. 11 is a car showing that the intelligent water detector unit can be located anywhere under the hood.

Referring to FIG. 11, an intelligent water detector unit (a system that automatically opens at least one window of a vehicle when the vehicle is in water) can be located anywhere under the hood. The water collector can be located in a forward portion of the vehicle and at a position of between 50% and 70% of the height of a front wheel of the vehicle, for example, about 60% of the height of the front wheel.

Figure 12:
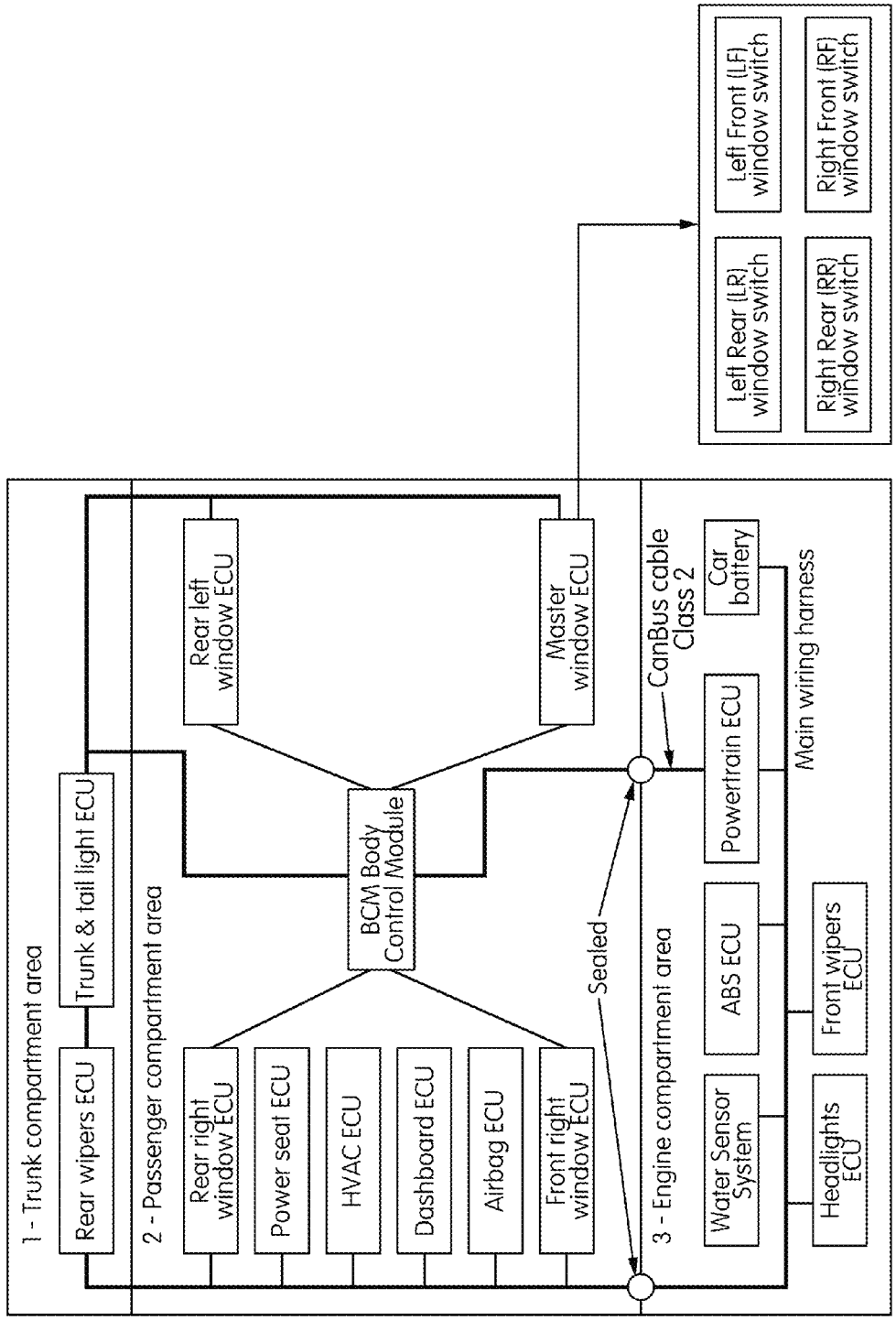
FIG. 12 shows a diagram of a car's electronic system.

Referring to FIG. 12, a car's electronic system includes three areas: the trunk compartment area, the passenger compartment area, and the engine compartment area. At least one window of the vehicle can include a window electronic control unit. The window electronic control unit can be sealed. The window electronic control unit can be water proof.

Figure 13:
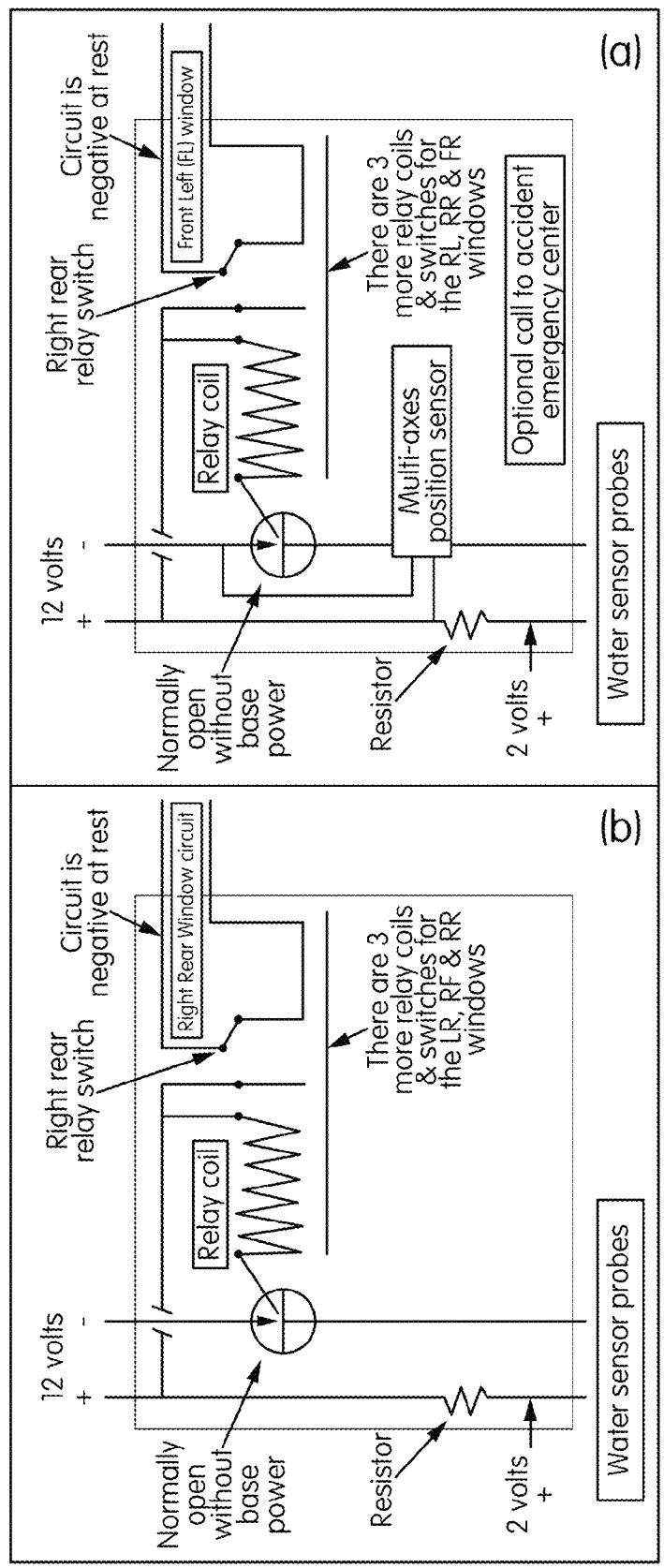
FIGS. 13(*a*) and 13(*b*) are block diagrams showing examples of the electronics components in FIG. 1.

Referring to FIG. 13(b), a system that automatically opens at least one window of a vehicle can include a multiple axes position sensor for detecting whether the vehicle is a substantially upright position and opening at least one window only if the vehicle is in the substantially upright position.

Figure 14:
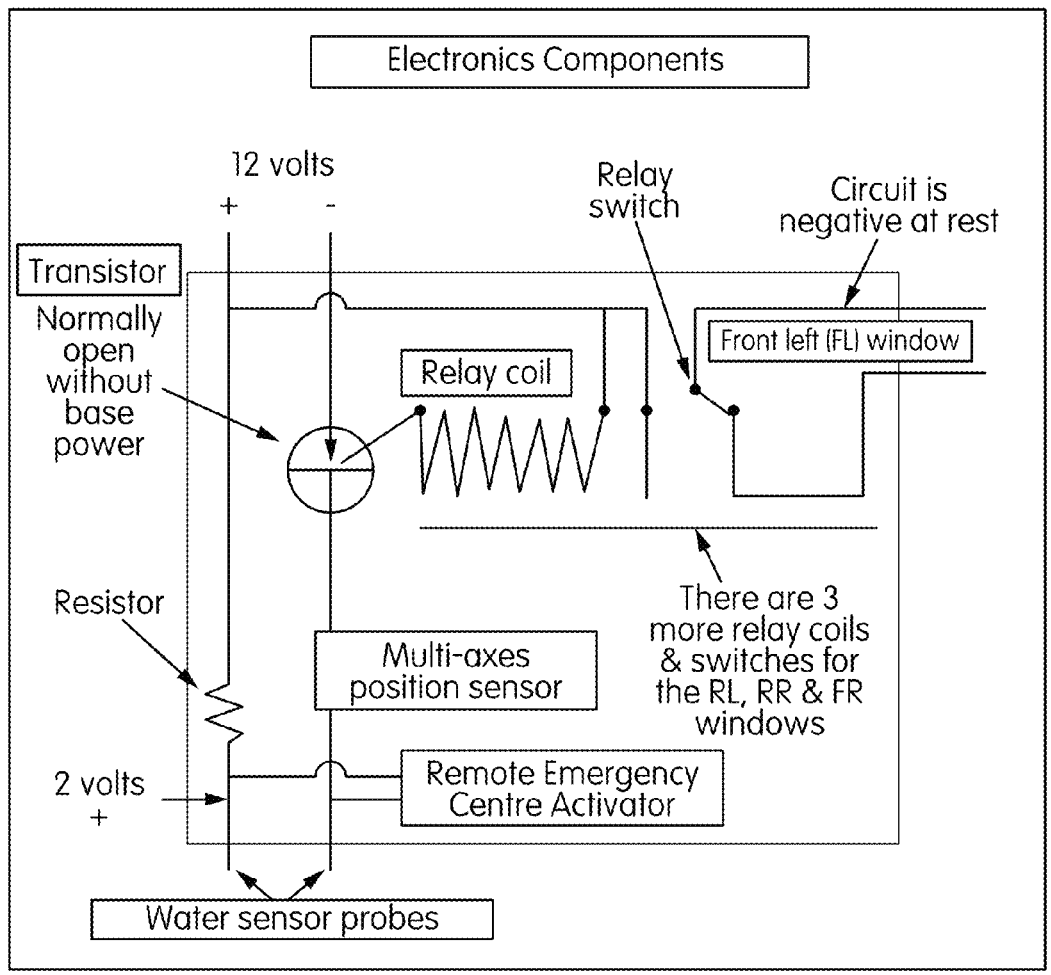
FIG. 14 is a block diagram showing an example of the electronics components in FIG. 1.

Referring to FIG. 14, a system that automatically opens at least one window of a vehicle can include a remote emergency center activator. The remote emergency center activator can be activated when the vehicle is in water. A 12-volt power source can supply power to remote emergency center activator (not shown in Figures). The system can also include a multi-axes position sensor. The position sensor can monitor the pitch and roll of the vehicle to determine the orientation of the vehicle in the water. The remote emergency center activator can be configured to receive a signal from a water sensor. The remote emergency center activator can be configured to be activated when the water sensor detects water in the water collector. The remote emergency center activator can be activated even the car is not in a substantially upright position. The emergency center activator sends a single or message to an alert system, for example, by a cellular, WiFi, or Bluetooth signal. The alert system can be an emergency monitoring system such as, for example, On Star, or mobile device application.

A method of automatically opening at least one window of a vehicle can include automatically detecting the presence of water in a water collector when the vehicle is in water, and automatically opening at least one window of the vehicle. The method can include forming a closed circuit with water in the collector. The method can include distinguishing splashing water from submerging water. The method can include detecting the orientation of the vehicle and opening the at least one window when the vehicle is not inverted. The method can include transmitting a distress signal when the presence of water in the water collector is detected. The method can include opening all moveable windows of the vehicle when the presence of water in the water collector is detected.

In essence, our system detects the presence of water within 2 to 3 seconds and the logic to determine when it's safe to open a vehicle's power windows takes no more than 20 seconds inferring that there is still ample time to open power windows before the outside level of the water has reached the power windows as evidenced by the results of our Manitoba field tests.

Trunk Compartment Area

Even if the Trunk compartment PCMS become inoperative due to water infiltration, they are not components involved in the window activation process.

Conclusion

It is therefore the object of the present invention to open at the earliest possible moment, the driver, front passenger, rear left passenger and rear right passenger windows without any intervention on the part of the driver and/or passenger(s). Based on several studies pertaining to people drowning in submersed vehicles, the primary cause of such drownings is due to the fact that in many instances, the driver and any passenger(s) inside a vehicle become traumatized/shocked the moment that said vehicle is plunged or driven into a body of water (capable of submerging the vehicle) to the point where it takes, on average, forty seconds for the driver and any passenger(s) to react to the situation and after forty seconds, the probability of opening one or more power windows at that time is very slim.

In embodiments, the invention is designed to open all of a vehicle's windows (excluding sun roof window) at the earliest moment that a vehicle is plunged into a body of water, without the driver's intervention. This in turn, provides an opportunity for any and all passengers to escape from the vehicle through the windows and minimizes the possibility of said passenger(s) from drowning inside the vehicle.

In embodiments, the invention is a fully automated (absolutely no human intervention required) proactive approach to minimizing the possibility of passenger(s) from drowning inside a vehicle when said vehicle is plunged into a body of water.

In embodiments, the invention is designed to automatically open all front & rear power windows.

In embodiments, the invention is designed for rapidity of installation on the assembly line by its ability to be easily integrated into a new vehicle's electronic and wiring design. Its design is modular and can be adapted to any automobile manufacturer's line of vehicles by their own engineers.

In embodiments, the invention is designed to be installed inside the engine compartment area as opposed to being installed inside a vehicle's door(s) or passenger compartment area that allows our invention to detect the presence of water at the earliest possible moment.

In embodiments, the invention will not activate the vehicle's power windows prematurely under most road conditions such as cases when the vehicle is being washed and driving through puddles of road water.

In embodiments of the invention, during routine vehicle maintenance, the end-consumer dealer's mechanic can easily verify the proper functionality of the invention by simply pouring water into water collector component to verify that all power windows open.

In embodiments of the invention, the ignition key must be on for the system to become operational—in other words, a parked vehicle cannot be stolen by tampering with the system.

In embodiment of the invention, should a vehicle land in the water sideways, on its roof or any position that is not upright, the system will not activate the power windows until the vehicle has safely rotated to an upright position. This is achieved by having integrated a multi axes position sensor into the system allowing it to recognize its exact roll and pitch positions at all times. In this regard, the applicant has noted that about 25% of vehicles land in water sideways or on their roof. If the windows are opened immediately in such case, the vehicle may sink rapidly. However, the Applicant has discovered that when a vehicle lands in water sideways or on its roof, the vehicle naturally rotates to a substantially upright position after a certain time, which varies from a few to several seconds depending on the vehicle size or its characteristics.

In embodiments of the invention, should the automakers convert from glass to polycarbonate windows, the operability of our system would not be affected.

The problem of thousands of passengers worldwide drowning each year in vehicles has been prevalent for years and the invention including its several safety features does not appear to be, or have been obvious to millions of people who design, repair or drive vehicles.

The scope of the claims should not be limited by the preferred embodiments set forth in the examples, but should be given the broadest interpretation consistent with the description as a whole.

What is claimed is:

1. A system for automatically opening at least one window of a vehicle, the at least one window being operably connected to an electric system of the vehicle, the vehicle comprising an engine compartment area, the system comprising:
   a water collector;
   a water sensor adapted to be installed on the water collector;
   wherein the water sensor is connectable to the electric system of the vehicle,
   wherein the water collector is located in the engine compartment, wherein the water collector includes:
      an inlet through which water enters the water collector;
      a one way outlet through which water leaves the water collector when the water collector is not submerged in water;
      a chamber including an opening for water to enter; and
      an opening for air to escape from the chamber; and
   whereby when the water sensor detects water in the water collector, the at least one window of the vehicle is automatically opened.

2. The system of claim 1, further comprising a remote emergency center activator configured to receive a signal from the water sensor.

3. The system of claim 2, wherein the remote emergency center activator is configured to be activated when the water sensor detects water in the water collector.

4. The system of claim 3, wherein the remote emergency center activator is activated even the car is not in a substantially upright position.

5. The system of claim 1, wherein the water sensor comprises at least one relay switch that is adapted to open at least one window of the vehicle when the water sensor detects water in the water collector.

6. The system of claim 1, wherein the water sensor includes a probe capable of forming a closed circuit with the presence of water.

7. The system of claim 1, wherein the water sensor is connected to the electric system of the vehicle through a wire.

8. The system of claim 1, wherein the water collector and the water sensor are in a housing.

9. The system of claim 1, wherein the water collector and the water sensor are in separate housings.

10. The system of claim 1, further comprising a multiple axes position sensor for detecting whether the vehicle is a substantially upright position and opening the at least one window only if the vehicle is in the substantially upright position.

11. The system of claim 1, wherein at least one window of the vehicle includes a window electronic control unit.

12. The system of claim 11, wherein the window electronic control unit is water proof.

13. The system of claim 1, wherein the water collector is configured to communicate with electronic components.

14. The system of claim 13, wherein the electronic components are housed separately from the water collector.

15. The system of claim 13, wherein the electronic components are integrated in a housing with the water collector.

16. A system for automatically opening and/or shattering at least one window of a vehicle, the system comprising:
   a water sensor for detecting that the vehicle is being submerged in water, wherein the water sensor is located in an engine compartment of the vehicle,
   a water collector comprising;
      an inlet through which water enters the water collector;
      a one way outlet through which water leaves the water collector when the water collector is not submerged in water;
      a chamber including an opening for water to enter; and
      an opening for air to escape from the chamber; and
   a multiple axes position sensor for detecting whether the vehicle is in a substantially upright position when the water sensor has detected that the vehicle is being submerged in water and opening the at least one window only if the vehicle is in the substantially upright position,
   wherein the water sensor is adapted to be installed on the water collector.

17. A method of automatically opening at least one window of a vehicle comprising automatically detecting the presence of water in a water collector when the vehicle is in water; and automatically opening at least one window of the vehicle, wherein the water collector includes:
   a water sensor;
   an inlet through which water enters the water collector;
   a one way outlet through which water leaves the water collector when the water collector is not submerged in water;
   a chamber including an opening for water to enter; and
   an opening for air to escape from the chamber.

18. The method of claim 17, further comprising forming a closed circuit with water in the collector.

19. The method of claim 17, further comprising distinguishing splashing water from submerging water.

20. The method of claim 17, further comprising detecting the orientation of the vehicle and opening the at least one window when the vehicle is not inverted.

21. The method of claim 17, further comprising transmitting a distress signal when the presence of water in the water collector is detected.

22. The method of claim 17, further comprising opening all moveable windows of the vehicle when the presence of water in the water collector is detected.

* * * * *